R. H. RICE.
PACKING.
APPLICATION FILED MAR. 23, 1918.

1,326,690.

Patented Dec. 30, 1919.

Inventor,
Richard H. Rice,
by Albert G. Davis
His Attorney.

UNITED STATES PATENT OFFICE.

RICHARD H. RICE, OF SWAMPSCOTT, MASSACHUSETTS, ASSIGNOR TO GENERAL ELECTRIC COMPANY, A CORPORATION OF NEW YORK.

PACKING.

1,326,690.   Specification of Letters Patent.   Patented Dec. 30, 1919.

Application filed March 23, 1918. Serial No. 224,139.

*To all whom it may concern:*

Be it known that I, RICHARD H. RICE, a citizen of the United States, residing at Swampscott, in the county of Essex, State of Massachusetts, have invented certain new and useful Improvements in Packings, of which the following is a specification.

The present invention relates to packings such as are utilized between a rotating shaft and a stationary member through which it passes to prevent leakage around the shaft, and has for its object to provide an improved packing which is short, can be easily assembled and dismantled, and which may be advantageously utilized to pack against high pressures.

For a consideration of what I believe to be novel and my invention, attention is directed to the accompanying specification and the claims appended thereto.

Figure 1:
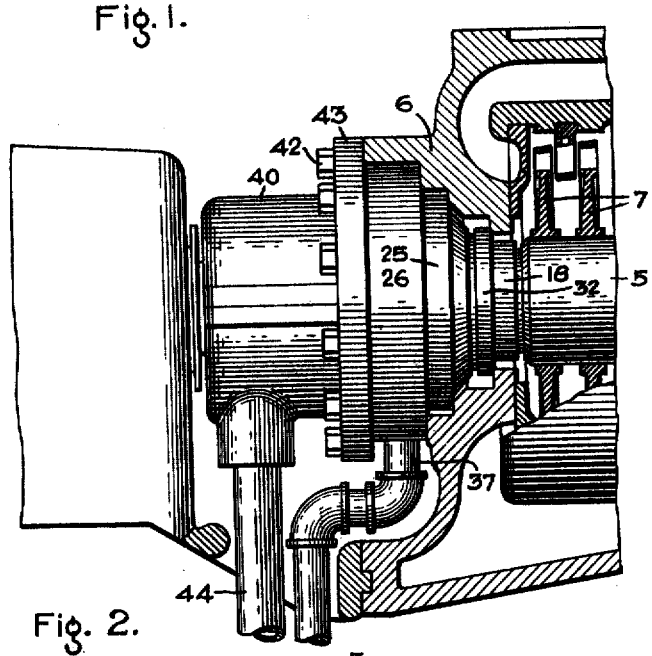
Figure 2:
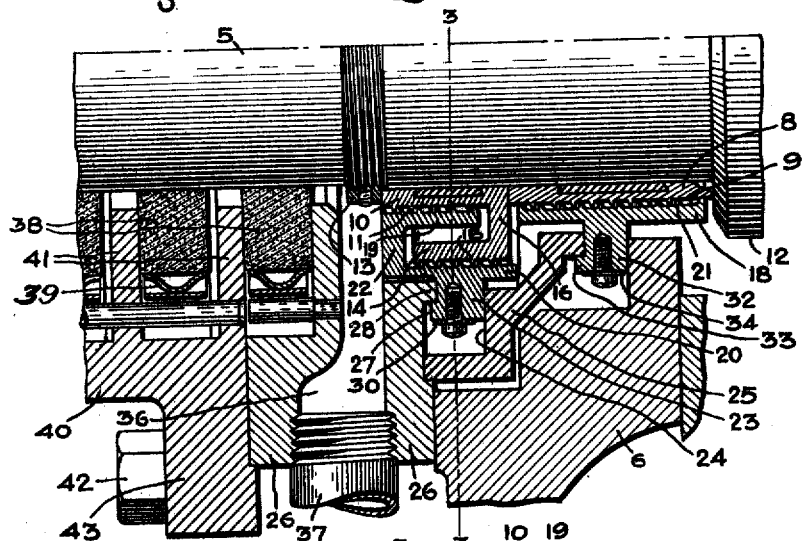
Figure 3:
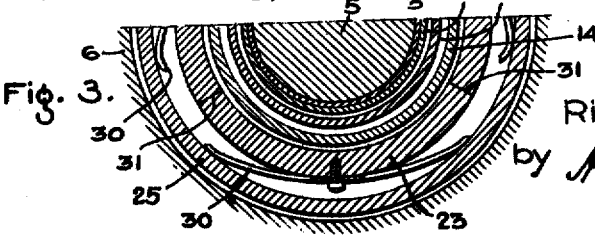

In the drawing, Figure 1 is a side elevation of an embodminet of my improved packing applied to an elastic fluid turbine, the turbine being shown partly in section; Fig. 2 is a sectional view of a portion of the packing, and Fig. 3 is a section taken on line 3—3, Fig. 2.

Referring to the drawing, 5 indicates a shaft extending through a casing 6. In the present instance the shaft is that of an elastic fluid turbine and is shown as carrying bucket wheels 7, and the packing is shown as being utilized at the high pressure end of the turbine. The packing comprises two portions, a high pressure portion which is of the labyrinth type and a low pressure portion which is preferably of the carbon ring type. The high pressure portion comprises a sleeve 8 fixed to shaft 5 and provided with radially extending projections 9 and a second sleeve 10, also fixed to the shaft 5 and provided with radially extending projections 11. The sleeves 8 and 10 are fixed against movement axially along the shaft by being held between a collar 12 on the shaft and a ring 13 threaded on to the shaft. Concentric with sleeves 8 and 10 and spaced radially therefrom is a packing sleeve 14, having projections 15 thereon. Packing sleeve 14 may be made of any suitable length and may be supported from the shaft in any suitable manner. In the present instance it is shown as being carried by a wall 16 formed integral with sleeve 10, the sleeves 10 and 14 and wall 16 thus forming one unitary structure. The sleeves 8, 10 and 14 form the rotating part of the labyrinth packing. The stationary part of the labyrinth packing comprises three packing rings 18, 19 and 20 which closely surround sleeves 8, 10 and 14, respectively, and have projections 21 which interleave with projections 9, 11 and 15. The packing rings 19 and 20 are formed integral with and connected to each other by a wall 22, and they are held in position by a collar 23 formed integral with ring 20 and held between the surface 24 of a packing box 25 and the surface of a holding ring 26. Collar 23 is provided with an axially extending flange 27, which engages a flange 28 on ring 26 to limit the movement of the packing rings 19 and 20 toward the shaft. The unitary structure comprising packing rings 19 and 20, wall 22 and flange 23 is spilt axially into two or more parts to facilitate the assembling of the packing rings and also to permit of a slight movement of the packing rings in case the shaft should run slightly out of true. Such unitary structure is thus divided into arc shaped sections and these sections are forced toward the shaft so as to bring flange 23 into engagement with flange 28 by means of suitable leaf springs 30, as is best shown in Fig. 3. In the present instance the structure is shown as being made in three parts, the joints between parts being indicated at 31 in Figs. 3. The packing ring 18 is provided with an annular collar 32 which projects between a surface of wall 6 and a surface of packing box 25 and is provided with an axially extending flange 33 which engages the outer surface of packing box 25 to limit the movement of packing ring 18 toward the shaft. The packing ring 18 is also formed in two or more arc shaped sections, the same as are packing rings 19 and 20 and they are held in position with the flange 33 against packing box 25 by means of suitable leaf springs 34.

The holding ring 26 is cored out to form an annular chamber 36 which surrounds the shaft between the high pressure portion and the low pressure portion of the packing, and communicating with this chamber is a drain pipe 37. The low pressure portion of the packing is shown as comprising a series of carbon rings 38 formed in a suitable number of arc shaped sections and held against the shaft by means of leaf springs 39. The holder for the carbon rings 38 comprises a sleeve 40, provided with a series of spaced projecting walls 41, the carbon rings 38 being located between such walls with the exception of the one farthest to the right which is held between a wall 41 and the surface of the holding ring 26. The entire packing structure is rigidly fixed together and to the casing wall 6 by a ring of bolts 42 which pass through a flange 43 on sleeve 40 and the holding ring 26. 44 indicates a drain pipe which is located between the two outermost carbon packing rings and is utilized to drain any condensate or elastic fluid from the packing so as to prevent as nearly as possible the escape of elastic fluid past the last carbon ring to atmosphere.

As is obvious, the path through which elastic fluid must flow in order to escape from the first stage of the turbine to atmosphere is first between packing rings 8 and 18, thence between packing rings 14 and 20, thence between packing rings 11 and 19 to the annular chamber 36 and from here it must escape past the series of carbon rings 38 in order to reach the atmosphere. A labyrinth packing I have found to be most satisfactory for packing against high elastic fluid pressures and I therefore utilize an arrangement of this type for the high pressure part of my packing. On the other hand, a carbon ring packing of the type shown is very satisfactory in packing against lower pressures. By forming parts of the labyrinth packing in concentric relation to each other I thereby obtained a comparatively short packing of this type and by utilizing such a packing in connection with the carbon ring packing shown, I obtained a complete packing which is also short in length and which is comparatively cheap to build and very efficient in service.

While I have referred herein specifically to the low pressure portion of my improved packing as being of the carbon ring type, it will, of course, be understood that I am not necessarily limited thereto but that I may use any other similar type of packing as may be found desirable in any particular installation. At present, however, I preferably use a packing of the so termed carbon ring type.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is:—

1. The combination with a shaft and a wall through which it passes, of a packing between the two which is made up of a high pressure portion and a low pressure portion, said high pressure portion comprising axially extending revolving ring members carried by the shaft, a packing box surrounding them, axially extending stationary ring members carried by said packing box, interleaving projections on said revolving and stationary ring members, and radially yielding means which holds the stationary ring members in operative relation to said rotating ring members.

2. The combination with a shaft and a wall through which it passes, of a packing between the two which is made up of a high pressure portion and a low pressure portion, said high pressure portion comprising axially extending revolving ring members carried by the shaft, a packing box surrounding them, axially extending stationary ring members carried by said packing box, interleaving projections on said revolving and stationary ring members, and radially yielding means which holds the stationary ring members in operative relation to said rotating ring members, and said low pressure portion comprising a sleeve which is fastened to said packing box and has a number of annular grooves therein, and packing rings located in said grooves.

3. The combination with a shaft and a wall through which it passes, of a packing between the two which is made up of a high pressure portion and a low pressure portion, said high pressure portion comprising axially extending revolving ring members carried by the shaft, a packing box surrounding them, axially extending stationary ring members carried by said packing box, interleaving projections on said revolving and stationary ring members, and radially yielding means which holds the stationary ring members in operative relation to said rotating ring members, and said low pressure portion comprising a sleeve which is fastened to said packing box and has a number of annular grooves therein, and packing rings located in said grooves, there being an annular chamber between said portions, and a drain pipe leading therefrom.

4. The combination with a shaft and wall through which it passes of a packing between the two comprising a high pressure portion of the labyrinth type and a low pressure portion of another type, said labyrinth type packing comprising concentric overlapping rings with interleaving projections between them, the stationary rings of the labyrinth packing being formed of arc shaped segments, and spring means for pressing the segments toward the shaft.

5. The combination with a shaft and a wall through which it passes of a labyrinth packing between the two comprising concentric overlapping rings carried by the shaft and provided with projections, and coöperating stationary rings carried by the wall and provided with projections which interleave with the projections on the first named rings, said stationary rings being formed of arc shaped segments, means for yieldingly pressing the segments toward the first named rings, and means for limiting their movement in such direction.

6. The combination with a shaft and wall through which it passes, of a packing between the two comprising a high pressure portion of the labyrinth type and a low pressure portion of another type, said labyrinth type packing comprising concentric overlapping rings with interleaving projections between them, the stationary rings of the labyrinth packing being formed of arc shaped segments, and spring means for pressing the segments toward the shaft, and said low pressure portion comprising an axially extending sleeve having grooves therein, and carbon ring carried in said grooves.

In witness whereof, I have hereunto set my hand this 18th day of March, 1918.

RICHARD H. RICE.